(12) United States Patent
Wiktor et al.

(10) Patent No.: US 11,205,965 B2
(45) Date of Patent: Dec. 21, 2021

(54) METHODS AND APPARATUS TO CALIBRATE A POWER CONVERTER

(71) Applicant: Texas Instruments Incorporated, Dallas, TX (US)

(72) Inventors: Stefan Wlodzimierz Wiktor, Raleigh, NC (US); Brian Thomas Lynch, Brookline, NH (US); Luis Gonzales, Washington, DC (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 19 days.

(21) Appl. No.: 16/714,140

(22) Filed: Dec. 13, 2019

(65) Prior Publication Data
US 2020/0228018 A1 Jul. 16, 2020

Related U.S. Application Data

(60) Provisional application No. 62/791,955, filed on Jan. 14, 2019.

(51) Int. Cl.
*H02M 3/156* (2006.01)
*H02M 3/158* (2006.01)
*H02M 3/335* (2006.01)
*H02M 1/00* (2006.01)

(52) U.S. Cl.
CPC ....... *H02M 3/33507* (2013.01); *H02M 3/156* (2013.01); *H02M 3/158* (2013.01); *H02M 2001/0025* (2013.01)

(58) Field of Classification Search
CPC ......... H02M 3/158; H02M 2001/0025; H02M 2001/0029; H02M 3/156; H02M 3/33507
See application file for complete search history.

(56) References Cited

U.S. PATENT DOCUMENTS

| | | | | |
|---|---|---|---|---|
| 5,479,329 A | * | 12/1995 | Motonobu | G01R 31/42 363/15 |
| 10,019,021 B1 | * | 7/2018 | Lee | G05F 1/575 |
| 2005/0010826 A1 | * | 1/2005 | Pullen | H02M 3/156 713/300 |
| 2013/0049720 A1 | * | 2/2013 | Nien | H02M 3/1588 323/271 |
| 2014/0253072 A1 | * | 9/2014 | Hussien | H02M 1/36 323/281 |

(Continued)

*Primary Examiner* — Sisay G Tiku
(74) *Attorney, Agent, or Firm* — Mark Allen Valetti; Charles A. Brill; Frank D. Cimino (57) ABSTRACT

Methods, apparatus, systems and articles of manufacture are disclosed to calibrate a power converter. An example apparatus includes a comparator including a first input terminal, a second input terminal, and an output terminal, the first input terminal of the comparator configured to be coupled to a filter to receive a filtered feedback signal, the second input terminal of the comparator configured to receive a first voltage signal, and the output terminal of the comparator coupled to a node, an oscillator including an output terminal, and a voltage stepper including a first input terminal, a second input terminal, and an output terminal, the first input terminal of the voltage stepper configured to receive a second voltage signal, the second input terminal of the voltage stepper coupled to the output terminal of the oscillator, and the output terminal of the voltage stepper configured to be coupled to an error amplifier.

19 Claims, 4 Drawing Sheets

(56) References Cited

U.S. PATENT DOCUMENTS

| | | | |
|---|---|---|---|
| 2016/0049866 A1* | 2/2016 | Sumii | H02M 1/36 |
| | | | 323/283 |
| 2016/0082845 A1* | 3/2016 | Yamaguchi | B60L 50/50 |
| | | | 307/10.1 |
| 2016/0082846 A1* | 3/2016 | Yamaguchi | G05F 3/262 |
| | | | 307/10.1 |
| 2016/0087526 A1* | 3/2016 | Satake | H02M 3/156 |
| | | | 323/282 |
| 2016/0126838 A1* | 5/2016 | Cavallini | H05B 47/10 |
| | | | 315/185 R |
| 2018/0006560 A1* | 1/2018 | Mascioli | H02M 3/158 |
| 2018/0026537 A1* | 1/2018 | Vicquery | H02M 1/32 |
| | | | 323/271 |
| 2018/0123581 A1* | 5/2018 | Chiu | H03K 17/063 |
| 2020/0228010 A1* | 7/2020 | Wiktor | H02M 3/156 |
| 2020/0228012 A1* | 7/2020 | Lynch | H02M 3/157 |

* cited by examiner

METHODS AND APPARATUS TO CALIBRATE A POWER CONVERTER

RELATED APPLICATION

This patent application claims the benefit of and priority to U.S. Provisional Patent Application Ser. No. 62/791,955 filed on Jan. 14, 2019, which is hereby incorporated herein by reference in its entirety.

FIELD OF THE DISCLOSURE

This disclosure relates generally to calibration, and, more particularly, to methods and apparatus to calibrate a power converter.

BACKGROUND

Power converters (e.g., buck converters, buck-boost converters, etc.) and/or various power electronic devices operate in response to a pulse width modulated signal generated by a pulse width modulated signal generator (PWM signal generator). In some power converters and/or various power electronic device applications, switches (e.g., transistors) are controlled by ramp-based PWM techniques (e.g., analog controlled) based on a comparison with one or more voltage reference signals. Manufacturers of power converters and/or various power electronic based devices have developed delay-based PWM techniques as an alternative to ramp-based PWM techniques.

DETAILED DESCRIPTION

The figures are not to scale. In general, the same reference numbers will be used throughout the drawing(s) and accompanying written description to refer to the same or like parts. Connection references (e.g., attached, coupled, connected, adapted to be coupled, configured to be coupled, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

Typical direct current to direct current (DC-DC) converters and/or other power electronic devices (e.g., alternating current (AC) inverters) utilize a number of switches (e.g., transistors) controlled by a controller that generates PWM signal. In such applications, the controller includes a PWM signal generator to generate and/or otherwise supply the PWM signal to the converter in response to monitoring the output voltage of the coupled DC-DC converter. In some applications, the PWM signal generator is an analog, ramp-based PWM signal generator. Alternatively, in other applications, the PWM signal generator is a delay pulse width modulated (DPWM) signal generator (e.g., a pulsed width modulator to generate a pulse width modulated signal based on a delay time and/or period, a delay-based pulse width modulator) rather than an analog, ramp based pulse width modulated signal generator (analog, ramp-based PWM signal generator).

An analog, ramp-based PWM signal generator generates a PWM signal by comparing a control signal voltage with a ramp-based signal (e.g., a saw tooth signal). A DPWM signal generator generates a PWM signal by introducing a delay corresponding to a desired pulse width. A DPWM signal generator includes delay cells controllable by at least one control signal. The control signal is generated by a controller and indicates the length of delay each of the plurality of delay cells is to introduce (e.g., 1.0 nanoseconds, 1.2 nanoseconds, etc.).

In situations and/or applications utilizing a PWM signal generator (e.g., an analog, ramp-based PWM signal generator and/or a DPWM signal generator), the output voltage of a coupled DC-DC power converter (e.g., a buck converter, a boost converter, a buck-boost converter, etc.) is regulated based on a comparison to a reference voltage. In such situations and/or applications, the components (e.g., remote sense amplifier, error amplifier, reference voltage generator, etc.) configured to regulate the output voltage of a coupled DC-DC power converter often operate with intrinsic errors (e.g., non-ideal voltages, parasitic voltage losses, parasitic inductances, parasitic capacitances, non-ideal voltage drops, non-ideal voltage differentials, etc.). For example, an error amplifier configured to compare an output voltage signal of a coupled DC-DC power stage (e.g., a feedback voltage signal) to a reference voltage signal may operate having a non-ideal voltage drop and/or otherwise having a voltage differential (e.g., 10 millivolt drop) between respective input terminals. Further, in such an example, because of the inherent intrinsic errors (e.g., non-ideal voltages, parasitic voltage losses, parasitic inductances, parasitic capacitances, non-ideal voltage drops, non-ideal voltage differentials, etc.), the error amplifier may generate an error output signal based on an inaccurate comparison of the output voltage signal (e.g., feedback voltage signal) and the reference voltage signal.

Figure 1:
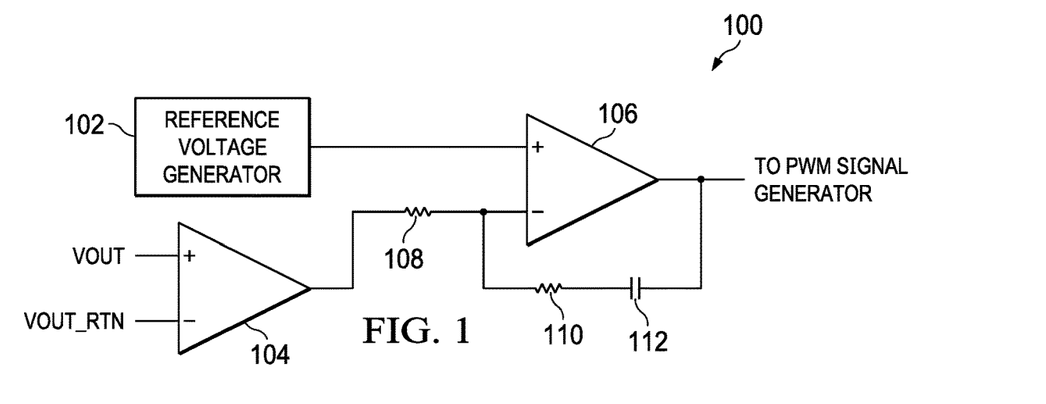
FIG. 1 is a schematic illustration of a system including of a reference voltage generator, a remote sense amplifier, and an error amplifier configured with trimmable components.

Typical DC-DC power converters include trimmable components (e.g., a trimmable resistor, trimmable capacitor, etc.) that are trimmed and/or otherwise adjusted during testing in order to correct intrinsic non-idealities existing in the output voltage regulation network and/or controller. FIG. 1 is a schematic illustration of a system 100 including a reference voltage generator 102, a remote sense amplifier 104, and an error amplifier 106 including internal trimmable components. The system 100 of FIG. 1 further includes a first resistor 108, a second resistor 110, and a capacitor 112. In FIG. 1, the error of the system 100 (e.g., the error of the output terminal 124 of the error amplifier 106) is determined using the below equation.

$$\text{Error} = \sqrt{RVG_{ERROR}^2 + RSA_{ERROR}^2 + EA_{ERROR}^2} \qquad \text{Equation 1}$$

In Equation 1, the variable $RVG_{ERROR}$ corresponds to the error tolerance of the reference voltage generator 102, the variable $RSA_{ERROR}$ corresponds to the error tolerance of the remote sense amplifier 104, and the variable $EA_{ERROR}$ corresponds to the error tolerance of the error amplifier 106. In order to reduce such an error tolerance, components in the error amplifier 106 (e.g., various internal resistors, capacitors, etc.) are trimmed. Such a process may also include trimming components in the reference voltage generator 102 and/or the remote sense amplifier 104.

Trimming and/or otherwise adjusting components (e.g., various components in the error amplifier 106) is a complex process that requires a large system area (e.g., a large silicon area on a printed circuit board (PCB)) due to the inclusion of trimmable components. Further, such a process is affected by both cost and area associated the addition of the trimmed components. Additionally, testing of the system 100 during production to trim the components of the error amplifier 106 is costly.

Examples described herein include methods and apparatus to calibrate a converter. Examples described herein include utilizing a comparator to compare a reference voltage signal (e.g., a precision reference voltage signal) with a feedback voltage signal (e.g., an output voltage signal) of a coupled DC-DC power stage. Examples described herein generate an example calibrated reference voltage signal (e.g., a sampled reference voltage signal) for use by an example error amplifier and/or any other subsequent circuit stage. Examples described herein utilize various components (e.g., a remote sense amplifier, a comparator, a digital to analog converter, and an oscillator) to calibrate a reference voltage signal (e.g., generate a calibrated reference voltage signal) to account for an intrinsic voltage differential (e.g., intrinsic voltage error) between respective input terminals of the error amplifier.

Further, examples described herein utilize a digital to analog converter configured to sample a reference voltage signal at a frequency determined by an oscillator. In such examples described herein, the digital to analog converter is configured to sample the reference voltage signal until a comparator determines that the feedback voltage signal (e.g., an output voltage signal) is greater than and/or equal to a precision reference voltage signal.

In examples described herein, the digital to analog converter is configured to sample the reference voltage signal during start-up of a coupled DC-DC power converter. Further in examples described herein, when the comparator determines the feedback voltage signal (e.g., an output voltage signal of a coupled DC-DC power converter) meets a threshold voltage of (e.g., is greater than and/or equal to) the reference voltage signal (e.g., precision reference voltage signal), the digital to analog converter no longer samples the reference voltage signal. As such, the resulting output signal of the digital to analog converter (e.g., the sampled reference voltage signal) is a calibrated reference voltage signal including a voltage equivalent to, or substantially similar to, the reference voltage signal (e.g., precision reference voltage signal) plus or minus the intrinsic voltage drop and/or otherwise voltage differential between respective input terminals of the error amplifier. In examples described herein, the calibrated reference voltage signal (e.g., sampled reference voltage signal) is generated using less components (e.g., trimmable components), and thus, using less area in the corresponding circuit.

Examples described herein utilize a remote sense amplifier configured to improve the accuracy of an output voltage signal by reducing the error associated with ground voltage drops (e.g., a voltage drop between a local ground and a reference and/or otherwise power stage ground).

Examples described herein include an example apparatus including a comparator including a first input terminal, a second input terminal, and an output terminal, the first input terminal of the comparator coupled to a filter and the second input terminal of the comparator coupled to a first voltage amplifier. The example apparatus further includes a digital to analog converter including a first input terminal, a second input terminal, and an output terminal, the first input terminal of the digital to analog converter coupled to a second voltage amplifier and the output terminal of the digital to analog converter coupled to an error amplifier. Additionally, the apparatus further includes an oscillator including an input terminal and an output terminal, the input terminal of the oscillator coupled to the output terminal of the comparator and the output terminal of the oscillator coupled to the second input terminal of the digital to analog converter.

Examples described herein include an apparatus to generate a sampled reference voltage signal, the apparatus including an oscillator to generate an oscillating signal and a digital to analog converter to sample a first reference voltage signal when the oscillating signal is enabled and output the sampled first reference voltage signal to an error amplifier. Such an example apparatus further includes a comparator to determine whether a feedback voltage signal meets a threshold voltage level of a second reference voltage signal and generate a control signal to cause the oscillator to disable the oscillating signal, the control signal generated in response to determining the feedback voltage signal meets the threshold voltage level of the second reference voltage signal.

Examples described herein include an example system including a power stage coupled to a load, the power stage to output a feedback voltage signal and a controller coupled to the power stage, the controller configured to provide a pulse width modulated signal to the power stage. In such an example system, the controller further includes a reference voltage generator to sample a first reference voltage signal until the feedback voltage signal meets a threshold voltage level of a second reference voltage signal, an error amplifier to compare the sampled first reference voltage signal with the feedback voltage signal to generate an error output signal, and a pulse width modulated signal generator to generate the pulse width modulated signal based on the error output signal.

Figure 2:
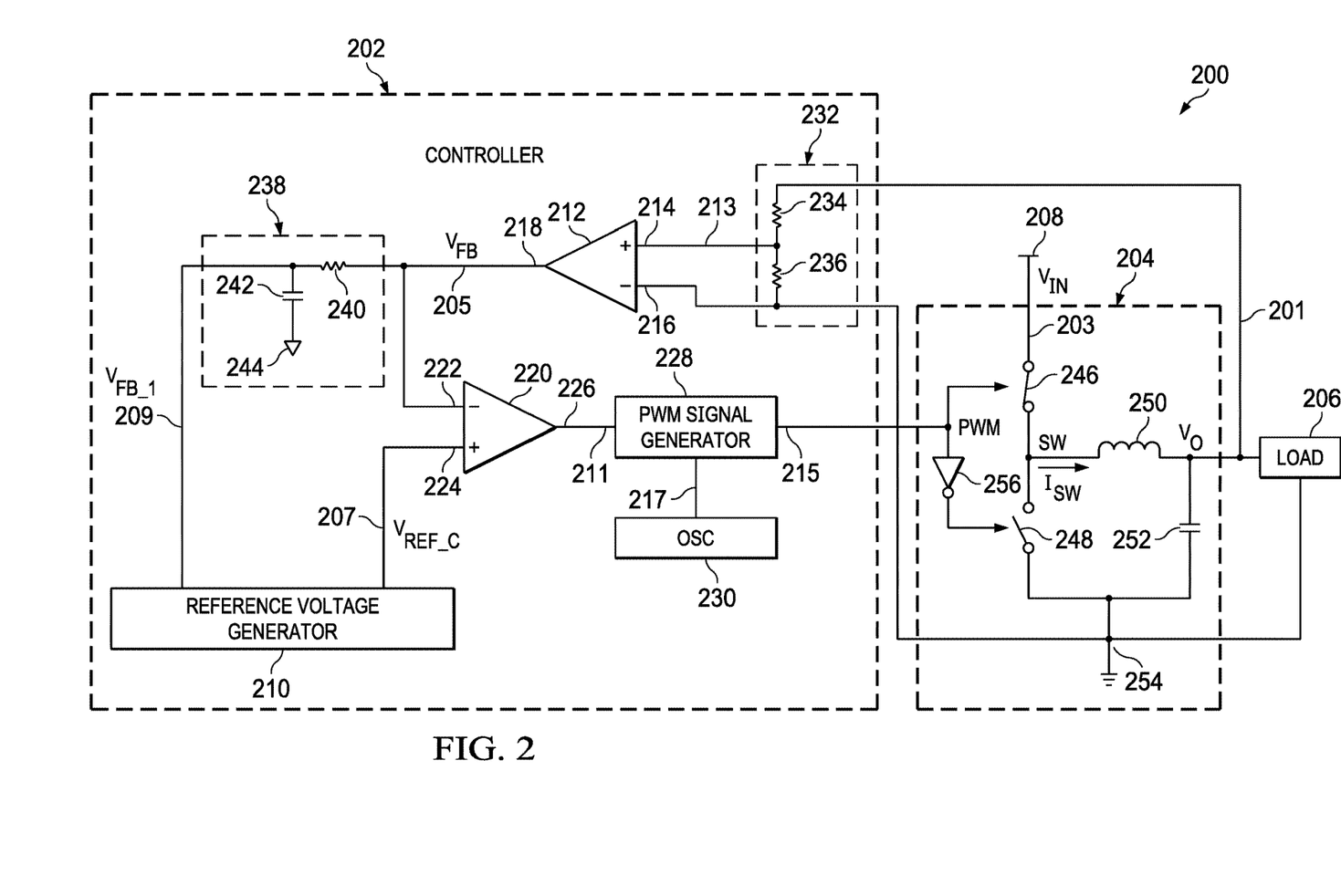
FIG. 2 is a block diagram of an example power converter system including an example controller including an example reference voltage generator.

FIG. 2 is a block diagram of an example power converter system 200 including an example controller 202 including an example reference voltage generator 210. The example power converter system 200 further includes an example power stage 204, an example load 206, and an example power supply 208. The controller 202 controls the power stage 204 to provide a desired voltage level to the load 206, where the desired voltage level is based on a preset or predetermined voltage level. The controller 202 includes the reference voltage generator 210 and an example remote sense amplifier 212 including an example first input terminal 214, an example second input terminal 216, and an example output terminal 218. Further, the controller 202 includes an example error amplifier 220 including an example first input terminal 222, an example second input terminal 224, and an example output terminal 226, an example PWM signal generator 228, and an example oscillator 230. The controller 202 additionally includes an example voltage divider 232 including an example first resistor 234 and an example second resistor 236, an example filter 238 including an example resistor 240, an example capacitor 242, and an example local reference rail 244. In examples disclosed herein, the controller 202 is an analog controller. However, in other examples disclosed herein, the controller 202 may be any suitable controller such as, for example, a digital controller, a microcontroller, a microprocessor, etc.

In other examples disclosed herein, the reference voltage generator 210 can be implemented on a separate chip than the controller 202. Alternatively, the reference voltage generator 210 may be implemented using any suitable number of chips internal and/or external to the controller 202. Additionally, any of the reference voltage generator 210, the remote sense amplifier 212, the error amplifier 220, the PWM signal generator 228, the oscillator 230, the voltage divider 232, and/or the filter 238 may be implemented external to the controller 202 on a separate chip.

In the example illustrated in FIG. 2, the power stage 204 includes an example first switch 246, an example second switch 248, an example inductor 250, an example capacitor 252, an example ground reference node 254, and an example inverter 256. In the illustrated example of FIG. 2, each of the first switch 246 and/or the second switch 248 include a first terminal (e.g., a current terminal), a second terminal (e.g., a current terminal), and a third terminal (e.g., a control terminal). In examples described herein, each of the first switch 246 and/or the second switch 248 may be implemented using any suitable switching device (e.g., n-channel metal-oxide-semiconductor field-effect transistor (NMOS), p-channel metal-oxide-semiconductor field-effect transistor (PMOS), etc.). In examples described herein, the inverter 256 may be implemented using any suitable logic circuitry and/or device in order to obtain an example PWM signal (PWM) from the PWM signal generator 228 and generate and/or otherwise provide respective high-side and/or low-side enable signals to each of the first switch 246 and/or the second switch 248, respectively.

In the example illustrated in FIG. 2, the power stage 204 is a DC to DC (DC-DC) converter controlled by the controller 202. The power stage 204 receives power to be converted from the power supply 208. In examples described herein, the power stage 204 is a DC-DC power converter such as a boost converter, buck-boost converter, etc. Alternatively, the power stage 204 may be any power stage (e.g., DC-DC converter, an AC to DC (AC-DC) converter, an AC to AC (AC-AC) converter, etc.) in any suitable telecom application, datacom application, server, automotive application (e.g., traction inverter in an electric vehicle (EV)), industrial application (e.g., bridge inverter, motor drive, etc.). In other examples, the power stage 204 may be two synchronous switches, additional power converter control logic, or a combination thereof. In FIG. 2, the power stage 204 produces the output voltage signal $V_O$ (line 201). Additionally, the output voltage signal $V_O$ (line 201) is monitored by the controller 202 and, more specifically, the error amplifier 220 as a feedback voltage signal $V_{FB}$ (line 205).

In the example illustrated in FIG. 2, the load 206 may be an LED array in an EV, a motor, a server, industrial and/or residential appliances, a datacom server, or any suitable load. In other examples, the load 206 may be one or more inductors, capacitors, resistors, or a combination thereof to filter the output of the power stage 204.

In the illustrated example of FIG. 2, the power supply 208 is an unregulated linear power supply. For example, the power supply 208 is the output of diode rectifier. In other examples, other power supplies may be used that are suitable to the application. The power supply 208 generates an input voltage signal $V_{IN}$ (line 203).

In the example illustrated in FIG. 2, the reference voltage generator 210 is a combination of one or more voltage regulators, amplifiers, comparators, and other logic that regulates one or more voltage levels in the controller 202. For example, the reference voltage generator 210 generates an example calibrated reference voltage signal $V_{REF\_C}$ (line 207) at a first voltage level based on the feedback signal voltage $V_{FB}$ (line 205), and, more specifically, an example second feedback voltage signal $V_{FB\_1}$ (line 209). In examples described herein, the calibrated reference voltage signal $V_{REF\_C}$ (line 207) may be referred to as a sampled reference voltage signal and/or a sample precision reference voltage signal. For example, the calibrated reference voltage signal $V_{REF\_C}$ (line 207) is generated by the reference voltage generator 210 by sampling a precision reference voltage signal. Further detail of the generation of the calibrated reference voltage signal $V_{REF\_C}$ (line 207) is explained in further detail below, in connection with FIG. 3. The second feedback voltage signal $V_{FB\_1}$ (line 209) is substantially similar to (e.g., within 5% of) the feedback voltage signal $V_{FB}$ (line 205). The second feedback voltage signal $V_{FB\_1}$ (line 209) is explained in further detail below.

In examples described herein, the calibrated reference voltage signal $V_{REF\_C}$ (line 207) is at a reference voltage level such that the intrinsic voltage drop and/or otherwise voltage differential error existing between the first input terminal 222 and the second input terminal 224 of the error amplifier 220 is minimized. For example, if there exists a 10 millivolt drop between the first input terminal 222 and the second input terminal 224 of the error amplifier 220, then the reference voltage generator 210 generates the calibrated reference voltage signal $V_{REF\_C}$ (line 207) at a reference voltage level equivalent to the sum of a desired reference voltage level (e.g., a precision reference voltage signal) and the voltage drop and/or voltage differential between the input terminals of the error amplifier 220. In such a manner, the operation of the error amplifier 220 is more efficient because the error amplifier will be generating an example error output signal (line 211) (e.g., a signal produced at the output terminal 226) when the power stage 204 output voltage signal $V_O$ (line 201) is equal to a desired reference voltage level. In some examples described herein, the calibrated reference voltage signal $V_{REF\_C}$ (line 207) is at a reference voltage level corresponding to soft startup of the power stage 204 such that the power stage 204 ramps up to a desired and/or predetermined voltage level (e.g., a desired reference voltage level). The operation of the reference voltage generator 210 is explained in further detail below, in connection with FIG. 3.

In the example illustrated in FIG. 2, the remote sense amplifier 212 includes the first input terminal 214, the second input terminal 216, and the output terminal 218. In FIG. 2, the first input terminal 214 is a non-inverting input terminal and is coupled to the voltage divider 232. More specifically, the first input terminal 214 is coupled in between the first resistor 234 and the second resistor 236, to obtain an example first voltage signal (line 213). In examples described herein, the first voltage signal (line 213) is proportional to the output voltage signal $V_O$ (line 201) (e.g., one fifth of the output voltage, one tenth of the output voltage, etc.). The second input terminal 216 is the inverting input terminal and is coupled to the voltage divider 232. More specifically, the second input terminal 216 is coupled to the ground reference node 254. The output terminal 218 is coupled to the filter 238 and to the error amplifier 220. More specifically, the output terminal 218 is coupled to the resistor 240 and to the first input terminal 222 of the error amplifier 220. In operation, the remote sense amplifier 212 is configured to improve the accuracy of the output voltage signal $V_O$ (line 201) by reducing the voltage drop between the ground reference node 254 of the power stage 204 and the local reference rail 244 of controller 202. For example, the remote sense amplifier 212 is configured to ensure the voltage drop from the output terminal 218 to the local reference rail 244 is equivalent to the voltage drop from the first input terminal 214 to the second input terminal 216, thus negating the voltage drop that may exist between the ground reference node 254 and the local reference rail 244. In other examples described herein, any suitable circuit, device, and/or method to implement the remote sense amplifier 212 may be utilized.

In the example illustrated in FIG. 2, the error amplifier 220 includes the first input terminal 222, the second input terminal 224, and the output terminal 226. In the topology of FIG. 2, the first input terminal 222 of the error amplifier 220 is coupled to the output terminal 218 of the remote sense amplifier 212. The second input terminal 224 of the error amplifier 220 is coupled to the reference voltage generator 210. The output terminal 226 of the error amplifier 220 is coupled to the PWM signal generator 228. The error amplifier 220 is a circuit that generates the error output signal (line 211) based a comparison between on one or more inputs from the remote sense amplifier 212 and the reference voltage generator 210. For example, the error amplifier 220 compares the calibrated reference voltage signal $V_{REF\_C}$ (line 207) with the feedback voltage signal $V_{FB}$ (line 205) to generate the error output signal (line 211).

In examples described herein, the error amplifier 220 may be a combination of a resistor, capacitor, and/or inductor feedback network and a conventional operational amplifier. In other examples described herein, the error amplifier 220 may be a combination of a resistor, capacitor, and/or inductor feedback network and a differential difference amplifier. During steady state and/or start-up operation, if the output voltage signal $V_O$ (line 201) of the power stage 204 deviates away from the desired level (e.g., if the feedback voltage signal $V_{FB}$ (line 205) increases and/or decreases above normal operating levels during transients), then the error amplifier 220 adjusts the error output signal (line 211) to account for such a change in the output voltage signal $V_O$ (line 201). In some examples described herein, the error amplifier 220 may include a plurality of error amplifiers such as a two-pole, 1-zero amplifier and/or a one-pole, one-zero amplifier to generate the control signal.

In the illustrated example of FIG. 2, the PWM signal generator 228 generates the PWM signal (line 215). The PWM signal generator 228 is used to provide the PWM signal (line 215) to the power stage 204 to provide power to the load 206.

In some examples described herein, the PWM signal generator 228 may be a DPWM signal generator and, as such, include a plurality of example delay cells to generate the PWM signal (line 215). In such examples described herein, the PWM signal generator 228 generates the PWM signal (line 215) by introducing a delay to an example oscillating signal (line 217) based on one or more of the input voltage signal $V_{IN}$ (line 203), the oscillating signal (line 217), and the calibrated reference voltage signal $V_{REF\_C}$ (line 207). Further in such an example, the duration of each delay cell of the delay cells in the PWM signal generator 228 is determined based on the error output signal (line 211) generated by the error amplifier 220.

In other examples described herein, the PWM signal generator 228 may be implemented using an analog, ramp-based PWM signal generator. In such an example, the PWM signal generator 228 would be coupled to the output terminal 226 of the error amplifier 220, to an example ramp signal generator, and to the power stage 204.

In the illustrated example of FIG. 2, the oscillator 230 is a phase locked loop oscillator. In other examples, the oscillator 230 is a capacitor (RC) oscillator, a ring oscillator, a crystal oscillator, or any other suitable oscillator for the application. In FIG. 2, the oscillator 230 produces an oscillating signal (line 217). In FIG. 2, the oscillating signal (line 217) may be a periodic and/or aperiodic signal generated to initiate the generation of the PWM signal (line 215) and/or otherwise set the frequency at which the PWM signal generator 228 operates. For example, when the oscillator 230 outputs the oscillating signal (line 217), the PWM signal generator 228 generates a corresponding rising edge on the PWM signal (line 215) when the oscillating signal (line 217) is at a falling edge. In some examples, the PWM signal generator 228 operates as a delay-based PWM signal generator and, as such, the PWM signal (line 215) is maintained at a logic high value for the duration of delay associated with a number of delay cells active in the PWM signal generator 228. In such an example, a suitable analog to digital converter (ADC) and/or a voltage controller (e.g., a feed forward voltage controller) may be utilized to control the number of delay cells active.

In the example of FIG. 2, the voltage divider 232 includes the first resistor 234 and the second resistor 236. The first resistor 234 of the voltage divider 232 is coupled to the output of the power stage 204 and to the second resistor 236. The second resistor 236 of the voltage divider 232 is coupled to the first resistor 234 and to the ground reference node 254. In operation, the voltage divider 232 is configured to provide a voltage signal (e.g., the first voltage signal (line 213) at the first input terminal 214 of the remote sense amplifier 212) that is proportional to the output voltage signal $V_O$ (line 201) of the power stage 204. In examples described herein, the first voltage signal (line 213) at the first input terminal 214 of the remote sense amplifier 212 is one-fifth of the output voltage signal $V_O$ (line 201). In other examples described herein, the voltage divider 232 may be configured (e.g., the first resistor 234 and the second resistor 236 may be configured) to produce any proportional first voltage signal at the first input terminal 214 of the remote sense amplifier 212 (e.g., a voltage signal equal to the output voltage signal $V_O$ (line 201), etc., a voltage less than the output voltage signal $V_O$ (line 201), etc.). The voltage divider 232 is a resistive divider network that allows the voltage level at the output of the power stage 204 to be measured and/or otherwise monitored by the error amplifier 220 and/or more generally, the controller 202 without a possibility of damaging the error amplifier 220 and/or more generally, the controller 202.

In the example illustrated in FIG. 2, the filter 238 includes the resistor 240, the capacitor 242, and the local reference rail 244. The resistor 240 of the filter 238 is coupled to the output terminal 218 of the remote sense amplifier 212, the first input terminal 222 of the error amplifier 220, to the reference voltage generator 210, and to the capacitor 242 of the filter 238. The capacitor 242 of the filter 238 is coupled to the resistor 240 of the filter 238, the reference voltage generator 210 and to the local reference rail 244. In the topology illustrated in FIG. 2, the filter 238 is a low-pass filter. In operation, the filter 238 is configured to pass the second feedback voltage signal $V_{FB\_1}$ (209) that is substantially similar to the feedback voltage signal $V_{FB}$ (line 205) to the reference voltage generator 210, while filtering out high frequency noise. For example, the second feedback voltage signal $V_{FB\_1}$ (line 209) may be a voltage signal including a voltage magnitude equivalent to the voltage magnitude of the feedback voltage signal $V_{FB\_1}$ (line 205).

Figure 3:
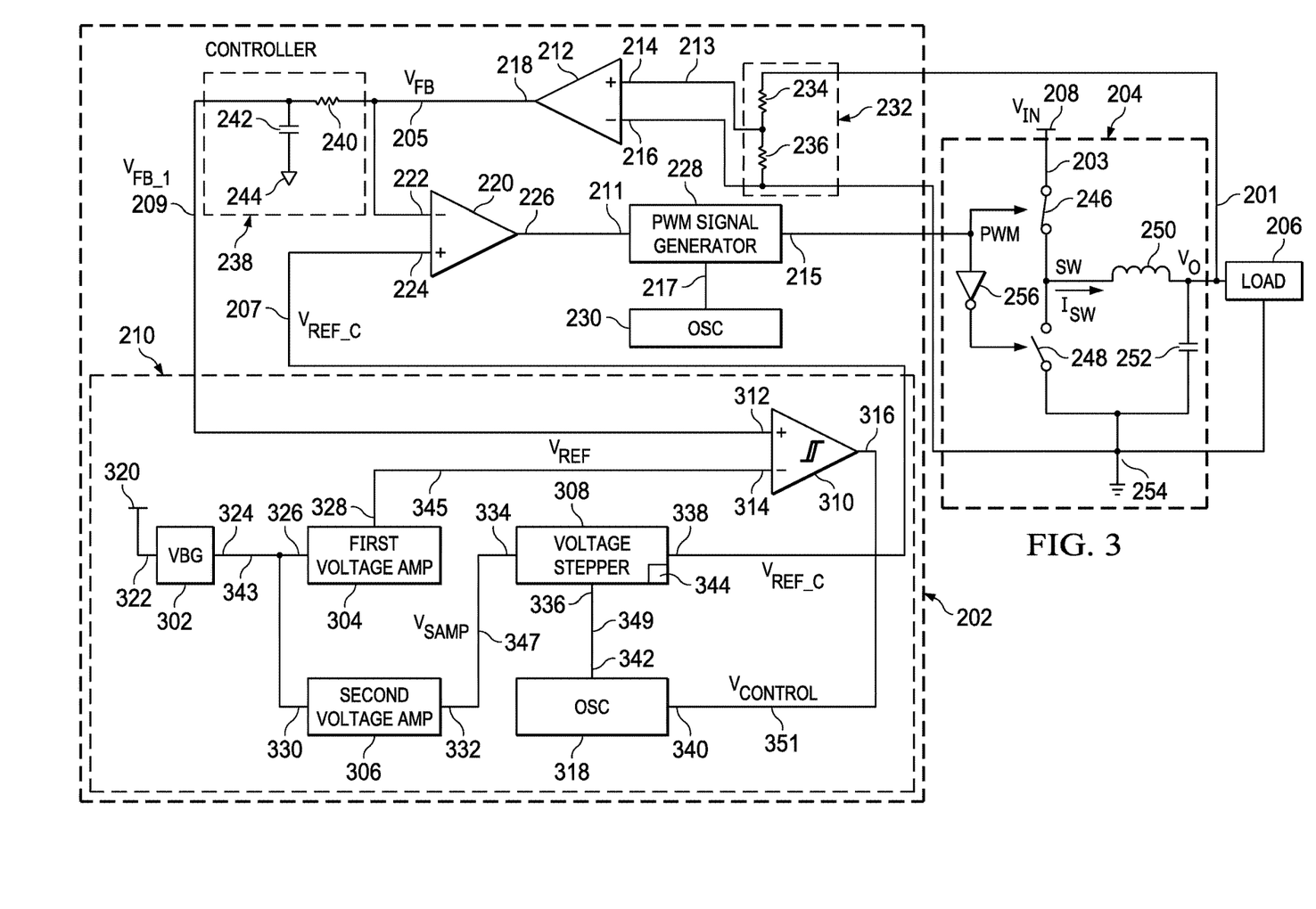
FIG. 3 is a schematic illustration showing further detail of an example of the reference voltage generator of FIG. 2.

FIG. 3 is a schematic illustration showing further detail of an example of the reference voltage generator 210 of FIG. 2. The reference voltage generator 210 includes a bandgap voltage source 302, a first voltage amplifier 304, a second voltage amplifier 306, a voltage stepper 308, a comparator 310 including a first input terminal 312, a second input terminal 314, and an output terminal 316, an oscillator 318, and the voltage supply node 320.

The bandgap voltage source 302 includes an example input terminal 322 and an example output terminal 324. The first voltage amplifier 304 includes an example input terminal 326 and an example output terminal 328. The second voltage amplifier 306 includes an example input terminal 330 and an example output terminal 332. The voltage stepper 308 includes an example first input terminal 334, an example second input terminal 336, and an example output terminal 338. The oscillator 318 includes an example input terminal 340 and an example output terminal 342.

In the example of FIG. 3, the input terminal 322 of the bandgap voltage source 302 is coupled to the voltage supply node 320, and the output terminal 324 of the bandgap voltage source 302 is coupled to first voltage amplifier 304 and to the second voltage amplifier 306.

In the example of FIG. 3, the bandgap voltage source 302 is a circuit that generates an example bandgap signal (line 343) that is at a voltage level (e.g., 1.25 volts) independent of operating temperature and voltage supply variations. For example, the bandgap voltage source 302 may be implemented by a Brokaw bandgap circuit. In other examples, the bandgap voltage source 302 may be any circuit that generates a bandgap reference voltage.

In the example of FIG. 3, the input terminal 326 of the first voltage amplifier 304 is coupled to the output terminal 324 of the bandgap voltage source 302, and the output terminal 328 of the first voltage amplifier 304 is coupled to the second input terminal 314 of comparator 310. The first voltage amplifier 304 is a device configured to generate an example precision reference voltage signal $V_{REF}$ (line 345).

In the example illustrated in FIG. 3, the input terminal 330 of the second voltage amplifier 306 is coupled to the output terminal 324 of the bandgap voltage source 302, and the output terminal 332 of the second voltage amplifier 306 is coupled to the first input terminal 334 of voltage stepper 308. The second voltage amplifier 306 is a device configured to generate an example sampling reference voltage signal $V_{SAMP}$ (line 347) with an arbitrary voltage level that is larger than any voltage level that may be input via filter 238 (FIG. 2) or the precision reference voltage signal $V_{REF}$ (line 345). For example, the first voltage amplifier 304 and/or the second voltage amplifier 306 may be implemented by a non-inverting amplifier. In other examples, the first voltage amplifier 304 and/or the second voltage amplifier 306 may be implemented by any suitable amplifier.

In the illustrated example of FIG. 3, the first input terminal 334 of the voltage stepper 308 is coupled to the output terminal 332 of the second voltage amplifier 306. The second input terminal 336 of the voltage stepper 308 is coupled to the output terminal 342 of the oscillator 318. The output terminal 338 of the digital to analog converter is coupled to the second input terminal 224 of the error amplifier 220 (FIG. 2). The voltage stepper 308 includes a digital to analog converter 344 configured to sample (e.g., increment a count of) a digital signal (e.g., a digital binary signal "000," a stepped signal, etc.) at a specified frequency. In operation, the sampling reference voltage signal $V_{SAMP}$ (line 347) includes a voltage level that indicates a desired threshold voltage (e.g., a maximum voltage) at which the voltage stepper 308 can sample towards. For example, the sampling reference voltage signal (line 347) may include a voltage of 1.6 volts and, thus, the voltage stepper 308 can increment the digital signal (e.g., the digital binary signal "000") up to an analog voltage level of 1.6 volts. The digital to analog converter 344 may be a twelve-bit digital to analog converter. In other examples described herein, any suitable voltage stepper may be used.

In the example of FIG. 3, the comparator 310 includes the first input terminal 312, the second input terminal 314, and the output terminal 316. The first input terminal 312 of the comparator 310 is a non-inverting input terminal and is coupled to the filter 238 of FIG. 2. In such a manner, the first input terminal 312 is configured to obtain and/or otherwise receive the second feedback voltage signal $V_{FB\_1}$ (line 209 of FIG. 2). The second input terminal 314 of the comparator 310 is coupled to the first voltage amplifier 304. In such a manner, the second input terminal 314 is configured to obtain and/or otherwise receive the precision reference voltage signal $V_{REF}$ (line 345). In the example of FIG. 3, the comparator 310 compares the precision reference voltage signal $V_{REF}$ (line 345) and the second feedback voltage signal $V_{FB\_1}$ (line 209) and determines whether the magnitude of the precision reference voltage signal $V_{REF}$ (line 345) meets a threshold value of the magnitude of the second feedback voltage signal $V_{FB\_1}$ (line 209). For example, the threshold voltage corresponds to an acceptable difference between the magnitude of the precision reference voltage signal $V_{REF}$ (line 345) and the magnitude of the second feedback voltage signal $V_{FB\_1}$ (line 209) based on the application.

In the example of FIG. 3, the input terminal 340 of the oscillator 318 is coupled to the output terminal 316 of the comparator 310. The output terminal 342 of the oscillator 318 is coupled to the second input terminal 336 of the voltage stepper 308. The oscillator 318 may be implemented by a phase locked loop oscillator. In other examples, the oscillator 318 is a capacitor (RC) oscillator, a ring oscillator, a crystal oscillator, or any other suitable oscillator for the application. The oscillator 318 produces an oscillating signal (line 349). In FIG. 3, the oscillating signal (line 349) may be a periodic and/or aperiodic signal generated to initiate the sampling of the voltage stepper 308. Additionally, the oscillator 318 includes the functionality to be enabled and/or disabled via, for example, the output terminal 316 of the comparator 310.

In example operation, the voltage stepper 308 and, more specifically, the digital to analog converter 344 increments a count of a digital binary signal when the oscillating signal (line 349) is a logic high value (e.g., at the rising edge of the oscillating signal (line 349) generated by the oscillator 318). Such an example sampling initiates the generation of the calibrated reference voltage signal $V_{REF\_C}$ (line 207). For example, the voltage stepper 308 and, more specifically, the digital to analog converter 344 may increment the count of the digital binary signal in one least significant bit (LSB) increments (e.g., 10 millivolts) of the digital to analog converter 344 at the frequency of the oscillating signal (line 349). Thus, as the voltage stepper 308 and, more specifically, the digital to analog converter 344 samples the voltage level of the digital binary signal, the voltage level of the calibrated reference voltage signal $V_{REF\_C}$ (line 207) slowly steps up towards the voltage level of the precision reference voltage signal $V_{REF}$ (line 345), at the frequency of the oscillator 318. When the comparator 310 determines that the voltage level at the first input terminal 312 (e.g., the voltage level of the second feedback voltage signal $V_{FB\_1}$ (line 209)) meets a threshold voltage of the voltage level at the second input terminal 314 (e.g., the precision reference voltage signal $V_{REF}$ (line 345)), the comparator 310 generates an example control signal $V_{CONTROL}$ (line 351) at the output terminal 316 to cause the oscillator 318 to disable the oscillating signal (line 349). For example, the control signal $V_{CONTROL}$ (line 351) is generated in response to the comparator 310 determining the second feedback voltage signal $V_{FB\_1}$ (line 209) being greater than or equal to the precision reference voltage signal $V_{REF}$ (line 345). In this manner, the calibrated reference voltage signal $V_{REF\_C}$ (line 207) is at a voltage level equivalent to sum of the precision reference voltage signal $V_{REF}$ (line 345) and the intrinsic voltage drop and/or otherwise voltage differential between the first input terminal 222 and the second input terminal 224 of the error amplifier 220 of FIG. 2. In other examples disclosed herein, the output terminal 316 of the comparator 310 may be coupled to any suitable node capable of indicating to the voltage stepper 308 to cease sampling. For example, the output terminal 316 of the comparator 310 may be coupled to an additional input terminal of the voltage stepper 308 and, as such, the voltage stepper 308 may initiate sampling or cease sampling based at the frequency of the oscillating signal (line 349) based on the control signal (line 351). Alternatively, any suitable logic gates and/or devices may be utilized in combination with the oscillating signal (line 349) and/or the control signal (line 351) to initiate and/or cease operation of the voltage stepper 308.

In one example, if the error amplifier 220 of FIG. 2 includes an intrinsic voltage drop and/or otherwise voltage differential of negative 10 millivolts between the input terminals (e.g., there is a 10 millivolt drop from the first input terminal 222 to the second input terminal 224), then the error amplifier 220 will not generate the error output signal (e.g., the error output signal (line 211) produced at the output terminal 226) until the calibrated reference voltage signal $V_{REF\_C}$ (line 207) steps up to a voltage level greater than 10 millivolts. At the first incrementing step, the voltage stepper 308 and, more specifically, the digital to analog converter 344 increments the digital binary signal by one LSB (e.g., generates the calibrated reference voltage signal $V_{REF\_C}$ (line 207) with a voltage level of 10 millivolts). Because of the above-mentioned example 10 millivolt drop between the input terminals of the error amplifier 220 (e.g., there is a 10 millivolt drop from the first input terminal 222 to the second input terminal 224), the error amplifier 220 will not generate the error output signal (line 211).

Further in such an example, at the second incrementing step of the oscillating signal (line 349), the voltage stepper 308 increments the digital binary signal by an additional LSB (e.g., generates the calibrated reference voltage signal $V_{REF\_C}$ (line 207) with a voltage level of 20 millivolts). As such, the error amplifier 220 now determines there is a 10 millivolt difference between the feedback voltage signal $V_{FB}$ (line 205) and the calibrated reference voltage signal $V_{REF\_C}$ (line 207). In this example, the voltage stepper 308 and, more specifically, the digital to analog converter 344 continues to increment the digital binary signal until either reaching a voltage equivalent to the sampling reference voltage signal $V_{SAMP}$ (line 347) or until the second feedback voltage signal $V_{FB\_1}$ (line 209) meets a threshold voltage level of (e.g., equal to) the precision reference voltage signal $V_{REF}$ (line 345). When the comparator 310 determines the second feedback voltage signal $V_{FB\_1}$ (line 209) meets a threshold voltage level of (e.g., equal to) the precision reference voltage signal $V_{REF}$ (line 345), the comparator 310 generates the control signal $V_{CONTROL}$ (line 351) to cease operation of the oscillator 318.

Additionally or alternatively, in another example disclosed herein, if the error amplifier 220 of FIG. 2 includes an intrinsic voltage drop and/or otherwise voltage differential of positive 10 millivolts between the input terminals (e.g., there is a 10 millivolt drop from the second input terminal 224 to the first input terminal 222). At the first incrementing step of the oscillating signal (line 349), the voltage stepper 308 and, more specifically, the digital to analog converter 344 increments a count of a digital binary signal by one LSB (e.g., generates the calibrated reference voltage signal $V_{REF\_C}$ (line 207) with a voltage level of 10 millivolts). Because of the above-mentioned example 10 millivolt drop between the input terminals of the error amplifier 220 (e.g., there is a 10 millivolt drop from the second input terminal 224 to the first input terminal 222), the error amplifier 220 will generate the error output signal (line 211) as if there is a 20 millivolt difference between the feedback voltage signal $V_{FB}$ (line 205) and the calibrated reference voltage signal $V_{REF\_C}$ (line 207). In this example, the voltage stepper 308 and, more specifically, the digital to analog converter 344 continues to increment the digital binary signal until the second feedback voltage signal $V_{FB\_1}$ (line 209) meets a threshold voltage level of (e.g., equal to) the precision reference voltage signal $V_{REF}$ (line 345). When the comparator 310 determines the second feedback voltage signal $V_{FB\_1}$ (line 209) meets a threshold voltage level of (e.g., equal to or greater than) the precision reference voltage signal $V_{REF}$ (line 345), the comparator 310 generates the control signal $V_{CONTROL}$ (line 351) to cease operation of the oscillator 318.

In examples described herein, any intrinsic voltage drop and/or otherwise voltage differential between the input terminals (e.g., a voltage drop and/or otherwise voltage differential from the first input terminal 222 to the second input terminal 224 of the error amplifier 220) can be calibrated.

Figure 4:
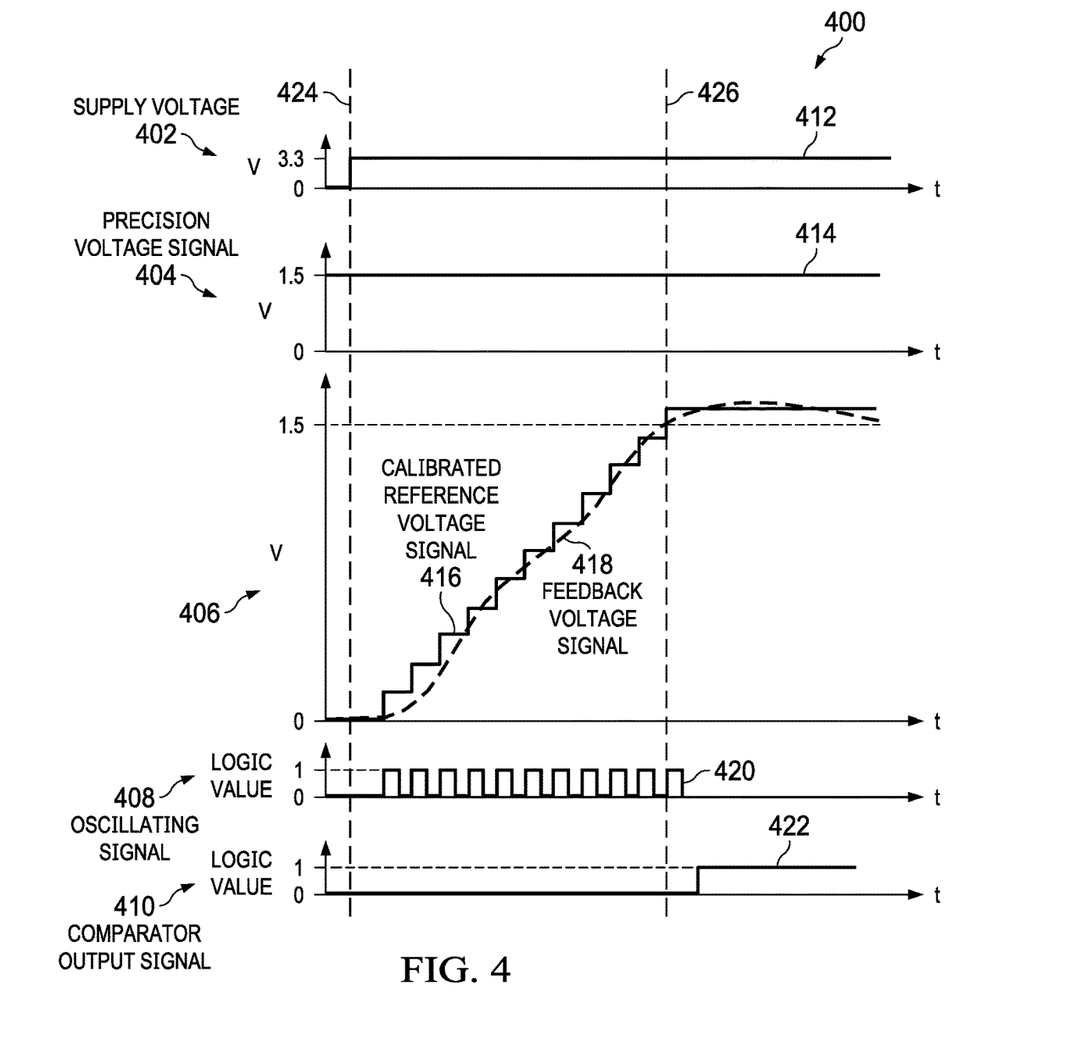
FIG. 4 is a timing diagram illustrating operation of the example reference voltage generator of FIGS. 2 and/or 3.

FIG. 4 is a timing diagram 400 illustrating operation of the example reference voltage generator 210 of FIGS. 2 and/or 3. The example timing diagram 400 includes an example first plot 402, an example second plot 404, an example third plot 406, an example fourth plot 408, and an example fifth plot 410.

In the example of FIG. 4, the first plot 402 includes an example supply voltage signal (line 412), the second plot 404 includes an example precision voltage signal (line 414), the third plot 406 includes an example calibrated reference voltage signal (line 416) and an example feedback signal (line 418), the fourth plot 408 includes an example oscillating signal (line 420), and the fifth plot 410 includes an example comparator control signal (line 422).

In the illustrated example of FIG. 4, the supply voltage signal (line 412) may represent the voltage level of the voltage supply node 320 (FIG. 3) versus time. The precision voltage signal (line 414) may represent the precision reference voltage signal $V_{REF}$ (line 345, FIG. 3) versus time. The calibrated reference voltage signal (line 416) may represent the calibrated reference voltage signal $V_{REF\_C}$ (line 207, FIG. 2, FIG. 3) versus time. The feedback signal (line 418) may represent the second feedback voltage signal $V_{FB\_1}$ (line 209, FIGS. 2 and/or 3) and/or the feedback voltage signal $V_{FB}$ (line 205, FIG. 2) versus time. The oscillating signal (line 420) may represent the oscillating signal (line 349, FIG. 3) versus time. The comparator control signal (line 422) may represent the control signal $V_{CONTROL}$ (line 351, FIG. 3) versus time.

In the illustrated example of FIG. 4, an example first time interval 424 represents start-up of one or more of the power converter system 200. For example, the first time interval 424 may represent power being connected to the controller 202. At the first time interval 424, the supply voltage signal (line 412) is at a value of 3.3 V, the precision voltage signal (line 414) is at value of 1.5 V, the calibrated reference voltage signal (line 416) is at a value of zero volts, the feedback signal (line 418) is at a value of zero volts, the oscillating signal (line 420) is at a logic low value, and the comparator control signal (line 422) is at a logic low value.

In the illustrated example of FIG. 4, between the first time interval 424 and an example second time interval 426, the calibrated reference voltage signal (line 416) being incremented in increments equal to one LSB of the digital to analog converter 344. For example, the calibrated reference voltage signal (line 416), is rising to a value equivalent to the sampling reference voltage signal $V_{SAMP}$ (line 347). Between the first time interval 424 and the second time interval 426, the supply voltage signal (line 412) remains at a value of 3.3 V, the precision voltage signal (line 414) remains at value of 1.5 V, the calibrated reference voltage signal (line 416) begins to rise from zero volts to a higher voltage incrementally (e.g., at the rising edge of the oscillating signal (line 420)), the oscillating signal (line 420) begins to oscillate at a frequency determined by an oscillator (e.g., the oscillator 318 of FIG. 3), and the comparator control signal (line 422) remains at a logic low value. As such, between the first time interval 424 and the second time interval 426, because the calibrated reference voltage signal (line 416) incrementally increases, the feedback signal (line 418) likewise increases.

In the illustrated example of FIG. 4, the second time interval 426 represents the time at which the feedback signal (line 418) meets the precision voltage signal (line 414). At second time interval 426, the supply voltage signal (line 412) remains at a value of 3.3 V, the precision voltage signal (line 414) remains at value of 1.5 V, and the calibrated reference voltage signal (line 416) is at a voltage potential slightly greater than (e.g., 10 millivolts, 50 millivolts, etc.) the precision voltage signal (line 414). The oscillating signal (line 420) is at a logic high value (e.g., a rising edge) for one additional step, and the comparator control signal (line 422), after a small delay (e.g., a delay due to the asynchronous nature of the comparator 310 (FIG. 3)), transitions from a logic low value to a logic high value. For example, once the feedback signal (line 418) is equal to and/or slightly greater than the precision voltage signal (line 414), the comparator generates the comparator control signal (line 422) to disable the oscillating signal (line 420).

Due to the topology of the reference voltage generator 210, as illustrated in FIGS. 2 and 3, the voltage stepper 308 and, more specifically, the digital to analog converter 344 increments the digital binary signal by additional LSB step, thereby causing the calibrated reference voltage signal (line 416) to be greater than the precision voltage signal (line 414) by a voltage equal to at least one least significant bit (LSB) of the voltage stepper 308. For example, at the second time interval 426, the calibrated reference voltage signal (line 416) is greater than the precision voltage signal (line 414) by a voltage equivalent to one LSB of the voltage stepper 308.

In the example illustrated in FIG. 4, the difference between the calibrated reference voltage signal (line 416) and the precision voltage signal (line 414) corresponds to the voltage drop and/or otherwise voltage differential error existing between the input terminals of the error amplifier 220 (FIG. 2). In other examples described herein, at the second time interval 426, the calibrated reference voltage signal (line 416) may be any voltage value greater than, less than, or equal to the precision voltage signal (line 414) if the voltage drop and/or otherwise voltage differential error between the input terminals of the error amplifier 220 is a positive voltage drop and/or otherwise voltage differential error, negative voltage drop and/or otherwise voltage differential error, no voltage drop and/or otherwise voltage differential error, etc.

While an example manner of implementing the reference voltage generator 210 of FIGS. 2 and/or 3 and/or, more generally, the controller 202 of FIG. 2 is illustrated in FIG. 3, one or more of the elements, processes and/or devices illustrated in FIGS. 2 and/or 3 may be combined, divided, re-arranged, omitted, eliminated and/or implemented in any other way. Further, the example bandgap voltage source 302, the example first voltage amplifier 304, the example second voltage amplifier 306, the example voltage stepper 308, the example comparator 310, the example oscillator 318, the example voltage supply node 320 and/or, more generally, the example reference voltage generator 210 of FIGS. 2 and/or 3, and/or the example reference voltage generator 210, the example remote sense amplifier 212, the example error amplifier 220, the example PWM signal generator 228, the example oscillator 230, the example voltage divider 232, the example filter 238 and/or, more generally, the example controller 202 of FIG. 2 may be implemented by hardware, software, firmware and/or any combination of hardware, software and/or firmware. Thus, for example, any of the example bandgap voltage source 302, the example first voltage amplifier 304, the example second voltage amplifier 306, the example voltage stepper 308, the example comparator 310, the example oscillator 318, the example voltage supply node 320 and/or, more generally, the example reference voltage generator 210 of FIGS. 2 and/or 3, and/or the example reference voltage generator 210, the example remote sense amplifier 212, the example error amplifier 220, the example PWM signal generator 228, the example oscillator 230, the example voltage divider 232, the example filter 238 and/or, more generally, the example controller 202 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example bandgap voltage source 302, the example first voltage amplifier 304, the example second voltage amplifier 306, the example voltage stepper 308, the example comparator 310, the example oscillator 318, the example voltage supply node 320 and/or, more generally, the example reference voltage generator 210 of FIGS. 2 and/or 3, and/or the example reference voltage generator 210, the example remote sense amplifier 212, the example error amplifier 220, the example PWM signal generator 228, the example oscillator 230, the example voltage divider 232, the example filter 238 and/or, more generally, the example controller 202 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example bandgap voltage source 302, the example first voltage amplifier 304, the example second voltage amplifier 306, the example voltage stepper 308, the example comparator 310, the example oscillator 318, the example voltage supply node 320 and/or, more generally, the example reference voltage generator 210 of FIGS. 2 and/or 3, and/or the example reference voltage generator 210, the example remote sense amplifier 212, the example error amplifier 220, the example PWM signal generator 228, the example oscillator 230, the example voltage divider 232, the example filter 238 and/or, more generally, the example controller 202 of FIG. 2 may include one or more elements, processes and/or devices in addition to, or instead of, those illustrated in FIGS. 2 and/or 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the example reference voltage generator 210 of FIGS. 2 and/or 3 and/or, more generally, the example controller 202 of FIG. 2 is shown in FIG. 4. The machine readable instructions may be an executable program or portion of an executable program for execution by one or more computer processors, one or more microcontrollers, etc. For example, the machine readable instructions may be executed by one or more integrated circuits, logic circuits, microprocessors, GPUs, DSPs, or controllers from any desired family or manufacturer. For example, the one or more integrated circuits, logic circuits, microprocessors, GPUs, DSPs, or controllers may be semiconductor based (e.g., silicon based) device(s). The program may be embodied in software stored on a non-transitory computer readable storage medium such as non-volatile memory, volatile memory, etc., associated with the one or more computer processors, the one or more microcontrollers, etc., but the entire program and/or parts thereof could alternatively be executed by a device other than the one or more computer processors, the one or more microcontrollers, etc., and/or embodied in firmware or dedicated hardware. Further, although the example program is described with reference to the flowchart illustrated in FIG. 4, many other methods of implementing the example reference voltage generator 210 of FIGS. 2 and/or 3 and/or, more generally, the example controller 202 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 5:
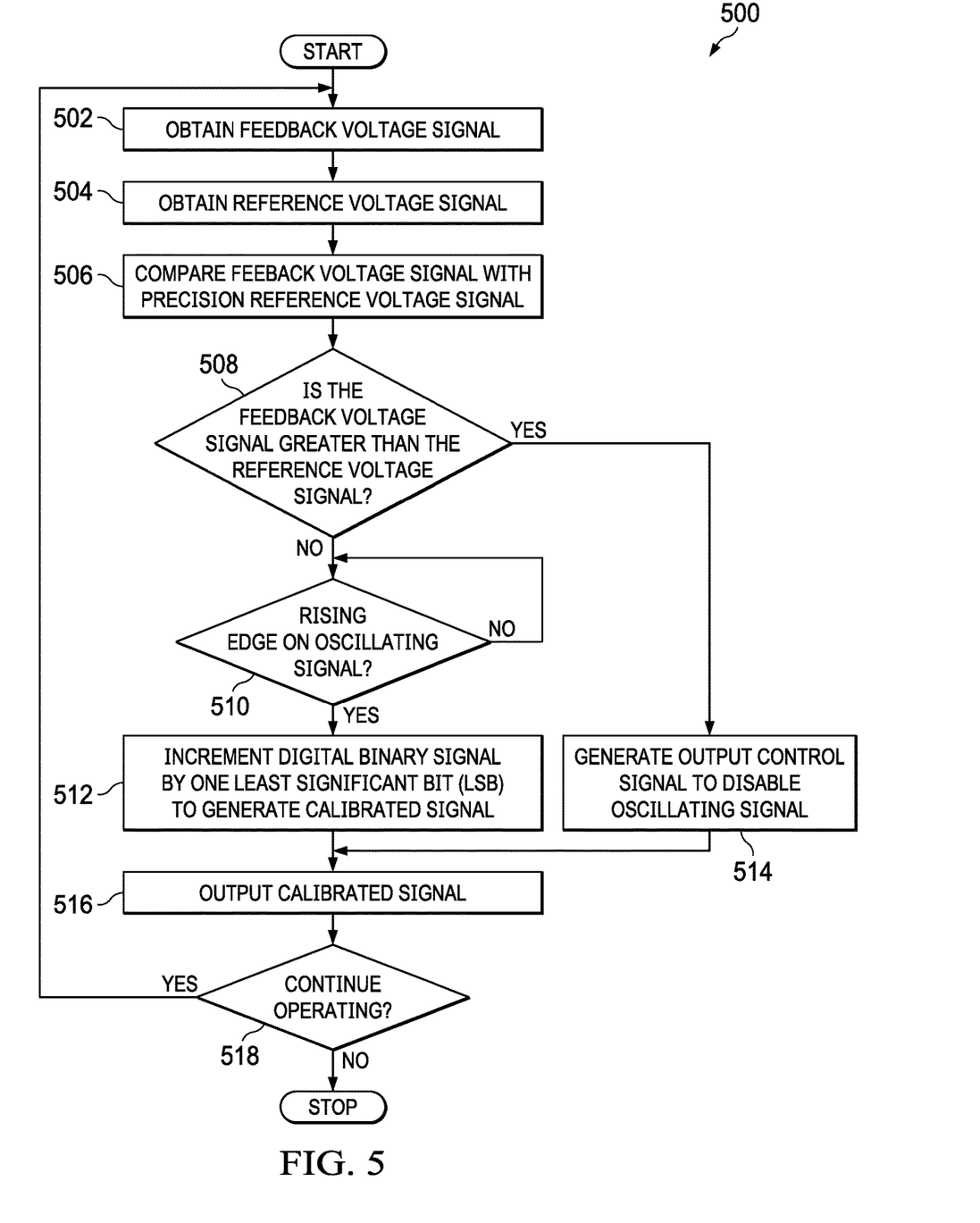
FIG. 5 is a flowchart representative of a process that may be implemented using logic or machine readable instructions that may be executed to implement the reference voltage generator of FIGS. 2 and/or 3 to generate the example calibrated reference voltage signal of FIGS. 2 and/or 3.

FIG. 5 is a flowchart representative of a process 500 that may be implemented using logic or machine readable instructions that may be executed to implement the reference voltage generator 210 of FIGS. 2 and/or 3 to generate the example calibrated reference voltage signal $V_{REF\_C}$ (line 207) of FIGS. 2 and/or 3. In the example illustrated in FIG. 5, the example comparator 310 obtains a feedback voltage signal (e.g., the second feedback voltage signal $V_{FB\_1}$ (line 209)). (Block 502). In addition the example comparator 310 obtains a reference voltage signal (e.g., the precision reference voltage signal $V_{REF}$ (line 345)). (Block 504).

The example comparator 310 compares the feedback voltage signal (e.g., the second feedback voltage signal $V_{FB\_1}$ (line 209)) with the reference voltage signal (e.g., the precision reference voltage signal $V_{REF}$ (line 345)). (Block 506). The comparator 310 determines whether the feedback voltage signal (e.g., the second feedback voltage signal $V_{FB\_1}$ (line 209)) is greater than the reference voltage signal (e.g., the precision reference voltage signal $V_{REF}$ (line 345)). (Block 508). In response to determining the feedback voltage signal (e.g., the second feedback voltage signal $V_{FB}$ (line 209)) is greater than the reference voltage signal (e.g., the precision reference voltage signal $V_{REF}$ (line 345)) (e.g., the control of block 508 returns a result of YES), control proceeds to block 514 in which the comparator 310 generates an output control signal (e.g., the control signal $V_{CONTROL}$ (line 351)) to disable the oscillating signal (e.g., the oscillating signal (line 349)). (Block 514). In response, control proceeds to block 516 in which the voltage stepper 308 outputs the incremented voltage signal (e.g., the calibrated reference voltage signal $V_{REF\_C}$ (line 207)). (Block 516).

Alternatively, in response to determining the feedback voltage signal (e.g., the second feedback voltage signal $V_{FB\_1}$ (line 209)) is not greater than the reference voltage signal (e.g., the precision reference voltage signal $V_{REF}$ (line 345)) (e.g., the control of block 508 returns a result of NO), control proceeds to block 510 in which the voltage stepper 308 determines whether there is a rising edge on the example oscillating signal (line 349). (Block 510).

In response to the voltage stepper 308 determining there is not a rising edge on the oscillating signal (line 349) (e.g., the control of block 510 returns a result of NO), then control returns to block 510 to wait. Alternatively, in response to the voltage stepper 308 determining there is a rising edge on the oscillating signal (line 349) (e.g., the control of block 510 returns a result of YES), then control proceeds to block 512 in which the voltage stepper 308 and, more specifically, the digital to analog converter, increments a digital binary signal by one LSB to generated a calibrated signal (e.g., the calibrated reference voltage signal $V_{REF\_C}$ (line 207)) (Block 512). In response, control proceeds to block 516 in which the voltage stepper 308 outputs the calibrated voltage signal (e.g., the calibrated reference voltage signal $V_{REF\_C}$ (line 207)). (Block 516).

In response, the comparator 310 determines whether to continue operating. (Block 518). If the comparator 310 determines to continue operating (e.g., the control of block 518 returns a result of YES), control returns to block 502. The comparator 310 may determine to continue operating (e.g., the control of block 518 returns a result of YES), in response to the feedback voltage signal not being greater than the precision reference voltage signal. Alternatively, if the comparator 310 determines not to continue operating (e.g., the control of block 518 returns a result of NO), the process 500 stops. The comparator 310 may determine not to continue operating (e.g., the control of block 518 returns a result of NO), in response to a loss of power, a shut-off event, etc.

From the foregoing, it will be appreciated that example methods, apparatus and articles of manufacture have been disclosed that calibrating for intrinsic errors (e.g., non-ideal voltages, parasitic voltage losses, parasitic inductances, parasitic capacitances, non-ideal voltage drops, non-ideal voltage differentials, etc.) in a power converter system. The disclosed methods, apparatus and articles of manufacture improve the efficiency of using a computing device by calibrating for intrinsic errors (e.g., non-ideal voltages, parasitic voltage losses, parasitic inductances, parasitic capacitances, non-ideal voltage drops, non-ideal voltage differentials, etc.) by sampling a reference voltage signal until a comparator determines that a feedback voltage signal (e.g., an output voltage signal) is greater than and/or equal to a second reference voltage signal (e.g., a precision reference voltage signal). As such, the sampled reference voltage signal (e.g., calibrated reference voltage signal) is utilized by an error amplifier. The resulting the sampled reference voltage signal is a calibrated reference voltage signal including a voltage equivalent to, or substantially similar to, a sum of a reference voltage signal (e.g., precision reference voltage signal) and the intrinsic voltage drop and/or otherwise voltage differential between respective input terminals of an error amplifier. In examples described herein, the calibrated reference voltage signal is generated using less components (e.g., trimmable components), and thus, using less area in the corresponding circuit. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to calibrate a power converter are disclosed herein. Further examples and combinations thereof include the following:

Example 1 includes an apparatus comprising a comparator including a first input terminal, a second input terminal, and an output terminal, the first input terminal of the comparator configured to be coupled to a filter to receive a filtered feedback signal, the second input terminal of the comparator configured to receive a first voltage signal, and the output terminal of the comparator coupled to a node, an oscillator including an output terminal, and a voltage stepper including a first input terminal, a second input terminal, and an output terminal, the first input terminal of the voltage stepper configured to receive a second voltage signal, the second input terminal of the voltage stepper coupled to the output terminal of the oscillator, and the output terminal of the voltage stepper configured to be coupled to an error amplifier.

Example 2 includes the apparatus of example 1, further including a first voltage amplifier to provide the first voltage signal, a second voltage amplifier to provide the second voltage signal, and a bandgap voltage source including an output terminal, the output terminal of the bandgap voltage source coupled to an input terminal of the first voltage amplifier and an input terminal of the second voltage amplifier.

Example 3 includes the apparatus of example 1, wherein the oscillator includes an input terminal and the node is the input terminal of the oscillator.

Example 4 includes the apparatus of example 3, wherein the input terminal of the oscillator is configured to receive a control signal from the output terminal of the comparator, the control signal to disable the oscillator.

Example 5 includes the apparatus of example 1, wherein the voltage stepper includes a third input terminal and the node is the third input terminal of the voltage stepper.

Example 6 includes the apparatus of example 1, wherein the error amplifier includes a first input terminal, a second input terminal, and an output terminal, wherein the first input terminal of the error amplifier is configured to be coupled to the output terminal of the voltage stepper, wherein the second input terminal of the error amplifier is configured to be coupled to the filter and to a remote sense amplifier, and wherein the output terminal of the error amplifier is configured to be coupled to a pulse width modulated signal generator.

Example 7 includes an apparatus to generate a sampled reference voltage signal, the apparatus comprising an oscillator configured to generate an oscillating signal, a voltage stepper configured to increment an output voltage signal in response to the oscillating signal, the incremented output voltage signal being a first reference voltage signal, and output the first reference voltage signal to an error amplifier, and a comparator to determine whether a feedback voltage signal meets a threshold voltage level of a second reference voltage signal, and generate a control signal to cause the oscillator to disable the oscillating signal, the control signal generated in response to determining the feedback voltage signal meets the threshold voltage level of the second reference voltage signal.

Example 8 includes the apparatus of example 7, wherein, when the control signal is generated, the first reference voltage signal includes a first voltage level equivalent to a sum of a second voltage level of the second reference voltage signal, and a third voltage level corresponding to a voltage differential between input terminals of the error amplifier.

Example 9 includes the apparatus of example 7, wherein the threshold voltage level is met when the feedback voltage signal is greater than or equal to the second reference voltage signal.

Example 10 includes the apparatus of example 7, wherein the oscillator is a phase locked loop oscillator.

Example 11 includes the apparatus of example 7, wherein the first reference voltage signal is greater than the second reference voltage signal.

Example 12 includes the apparatus of example 7, wherein the voltage stepper is configured to increment the output voltage signal when the oscillating signal is a logic high value.

Example 13 includes a system comprising a power stage coupled to a load, the power stage configured to output a feedback voltage signal, and a controller coupled to the power stage, the controller configured to provide a pulse width modulated signal to the power stage, the controller including a reference voltage generator configured to generate a first reference voltage signal by incrementing a stepped signal until the feedback voltage signal meets a threshold voltage level of a second reference voltage signal, an error amplifier configured to compare the first reference voltage signal with the feedback voltage signal to generate an error output signal, and a pulse width modulated signal generator configured to generate the pulse width modulated signal based on the error output signal.

Example 14 includes the system of example 13, wherein the controller further includes a remote sense amplifier coupled to the power stage and to the reference voltage generator, the remote sense amplifier configured to provide the feedback voltage signal to the error amplifier.

Example 15 includes the system of example 14, wherein the controller further includes a voltage divider coupled to the remote sense amplifier and the power stage.

Example 16 includes the system of example 13, wherein, when the threshold voltage level is met, the first reference voltage signal includes a first voltage level equivalent to a sum of a second voltage level of the second reference voltage signal, and a third voltage level corresponding to a voltage differential between input terminals of the error amplifier.

Example 17 includes the system of example 13, wherein the reference voltage generator is configured to increment the stepped signal at a frequency based on an oscillating signal.

Example 18 includes the system of example 13, wherein the threshold voltage level is met when the feedback voltage signal is greater than or equal to the second reference voltage signal.

Example 19 includes the system of example 13, wherein the pulse width modulated signal generator is a delay pulse width modulated signal generator.

Example 20 includes the system of example 13, wherein the pulse width modulated signal generator is an analog, ramp-based pulse width modulated signal generator.

The following claims are hereby incorporated into this Detailed Description by this reference, with each claim standing on its own as a separate embodiment of the present disclosure.

What is claimed is:

1. An apparatus comprising:
a comparator including a first input terminal, a second input terminal, and an output terminal, the first input terminal of the comparator configured to be coupled to a filter to receive a filtered feedback signal, the second input terminal of the comparator configured to receive a first voltage signal, and the output terminal of the comparator coupled to a node;
an oscillator including an output terminal; and
a voltage stepper including a first input terminal, a second input terminal, and an output terminal, the first input terminal of the voltage stepper configured to receive a second voltage signal, the second input terminal of the voltage stepper coupled to the output terminal of the oscillator, and the output terminal of the voltage stepper configured to be coupled to an error amplifier.

2. The apparatus of claim 1, further including a first voltage amplifier to provide the first voltage signal, a second voltage amplifier to provide the second voltage signal, and a bandgap voltage source including an output terminal, the output terminal of the bandgap voltage source coupled to an input terminal of the first voltage amplifier and an input terminal of the second voltage amplifier.

3. The apparatus of claim 1, wherein the oscillator includes an input terminal and the node is the input terminal of the oscillator.

4. The apparatus of claim 3, wherein the input terminal of the oscillator is configured to receive a control signal from the output terminal of the comparator, the control signal to disable the oscillator.

5. The apparatus of claim 1, wherein the voltage stepper includes a third input terminal and the node is the third input terminal of the voltage stepper.

6. The apparatus of claim 1, wherein the error amplifier includes a first input terminal, a second input terminal, and an output terminal, wherein the first input terminal of the error amplifier is configured to be coupled to the output terminal of the voltage stepper, wherein the second input terminal of the error amplifier is configured to be coupled to the filter and to a remote sense amplifier, and wherein the output terminal of the error amplifier is configured to be coupled to a pulse width modulated signal generator.

7. An apparatus to generate a sampled reference voltage signal, the apparatus comprising:
an oscillator configured to generate an oscillating signal;
a voltage stepper configured to:
increment an output voltage signal in response to the oscillating signal, the incremented output voltage signal being a first reference voltage signal; and
output the first reference voltage signal to an error amplifier; and
a comparator to:
determine whether a feedback voltage signal meets a threshold voltage level of a second reference voltage signal; and
generate a control signal to cause the oscillator to disable the oscillating signal, the control signal generated in response to determining the feedback voltage signal meets the threshold voltage level of the second reference voltage signal.

8. The apparatus of claim 7, wherein, when the control signal is generated, the first reference voltage signal includes a first voltage level equivalent to a sum of:
a second voltage level of the second reference voltage signal; and
a third voltage level corresponding to a voltage differential between input terminals of the error amplifier.

9. The apparatus of claim 7, wherein the threshold voltage level is met when the feedback voltage signal is greater than or equal to the second reference voltage signal.

10. The apparatus of claim 7, wherein the oscillator is a phase locked loop oscillator.

11. The apparatus of claim 7, wherein the first reference voltage signal is greater than the second reference voltage signal.

12. The apparatus of claim 7, wherein the voltage stepper is configured to increment the output voltage signal when the oscillating signal is a logic high value.

13. A system comprising:
a power stage coupled to a load, the power stage configured to output a feedback voltage signal; and
a controller coupled to the power stage, the controller configured to provide a pulse width modulated signal to the power stage, the controller including:
a reference voltage generator configured to generate a first reference voltage signal by incrementing a stepped signal until the feedback voltage signal meets a threshold voltage level of a second reference voltage signal;
an error amplifier configured to compare the first reference voltage signal with the feedback voltage signal to generate an error output signal;
a pulse width modulated signal generator configured to generate the pulse width modulated signal based on the error output signal; and
a remote sense amplifier coupled to the power stage and to an input of the reference voltage generator, the remote sense amplifier configured to provide the feedback voltage signal to the error amplifier.

14. The system of claim 13, wherein the controller further includes a voltage divider coupled to the remote sense amplifier and the power stage.

15. The system of claim 13, wherein the reference voltage generator is configured to increment the stepped signal at a frequency based on an oscillating signal.

16. The system of claim 13, wherein the threshold voltage level is met when the feedback voltage signal is greater than or equal to the second reference voltage signal.

17. The system of claim 13, wherein the pulse width modulated signal generator is a delay pulse width modulated signal generator.

18. The system of claim 13, wherein the pulse width modulated signal generator is an analog, ramp-based pulse width modulated signal generator.

19. A system comprising:
- a power stage coupled to a load, the power stage configured to output a feedback voltage signal; and
- a controller coupled to the power stage, the controller configured to provide a pulse width modulated signal to the power stage, the controller including:
  - a reference voltage generator configured to generate a first reference voltage signal by incrementing a stepped signal until the feedback voltage signal meets a threshold voltage level of a second reference voltage signal;
  - an error amplifier configured to compare the first reference voltage signal with the feedback voltage signal to generate an error output signal; and
  - a pulse width modulated signal generator configured to generate the pulse width modulated signal based on the error output signal; and
- wherein, when the threshold voltage level is met, the first reference voltage signal includes a first voltage level equivalent to a sum of:
- a second voltage level of the second reference voltage signal; and
- a third voltage level corresponding to a voltage differential between input terminals of the error amplifier.

* * * * *